United States Patent [19]

Tuhro

[11] 3,906,379

[45] Sept. 16, 1975

[54] THRESHOLD ERROR COMPENSATOR FOR PULSE WIDTH MEASUREMENT CIRCUIT

[75] Inventor: Richard H. Tuhro, Norwood, Mass.

[73] Assignee: Computer Identics Corporation, Westwood, Mass.

[22] Filed: Apr. 25, 1974

[21] Appl. No.: 464,137

[52] U.S. Cl. ............ 328/112; 307/234; 307/235 R; 328/115; 328/147

[51] Int. Cl.² .......................................... H03K 5/20

[58] Field of Search......... 307/234, 235 R; 328/111, 328/112, 114, 115, 116, 146, 147, 150

[56] References Cited

UNITED STATES PATENTS

| | | | |
|---|---|---|---|
| 3,299,271 | 1/1967 | Stites | 307/304 |
| 3,553,593 | 1/1971 | Gedance | 328/116 |
| 3,600,688 | 8/1971 | Booth | 328/111 |
| 3,611,157 | 10/1971 | Hughes | 328/112 |

OTHER PUBLICATIONS

"Gated Output Data Detection" by Coburn et al., IBM Tech Discl. Bull. Vol. 13, No. 2, July 1970, page 353.

"Detection in Readback Circuits" by Martin, IBM Tech Discl. Bull. Vol. 14, No. 4, Sept. 1971 pages 1168–1169.

*Primary Examiner*—Stanley D. Miller, Jr.
*Attorney, Agent, or Firm*—Joseph S. Iandiorio

[57] ABSTRACT

A threshold error compensator circuit responsive to an input signal and a pulse derived therefrom and having a width determined by the width of the input signal at a predetermined relative amplitude comprising a threshold level generator; a comparator, responsive to the threshold level from the threshold level generator and to the input signal to provide a thresholded signal having a pulse width measured at the threshold level; and a gate responsive to the pulse and thresholded signal to provide an output signal having a pulse width equal to that of the narrower of the pulse and thresholded signal.

2 Claims, 16 Drawing Figures

THRESHOLD ERROR COMPENSATOR FOR PULSE WIDTH MEASUREMENT CIRCUIT

FIELD OF THE INVENTION

Figure 1:
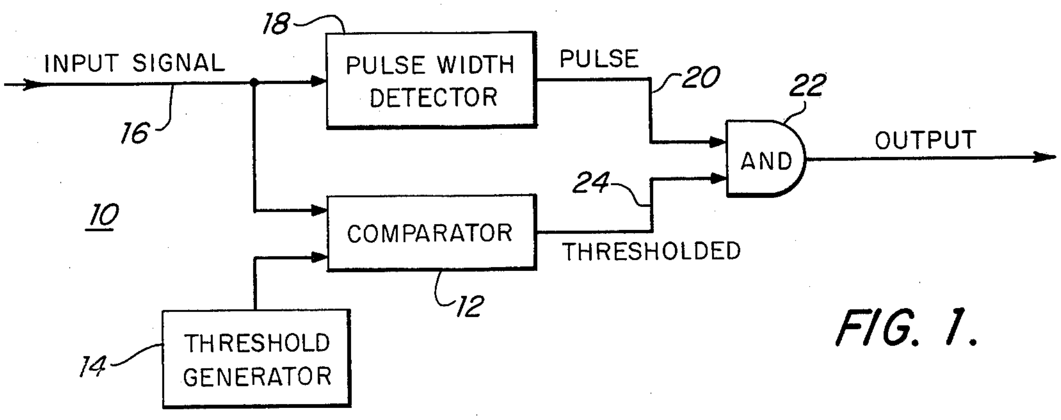

This invention relates to a threshold error compensator circuit for reducing error caused by the use of a noise rejecting threshold in a pulse width measuring circuit.

BACKGROUND OF THE INVENTION

In many signal processing systems, such as automatic label reading systems and the like, it is desirable to provide practical circuitry for measuring the width of pulses that have widely varying amplitudes, rise times and shapes. In one prior art technique the width of pulses is measured at the mid- or half-amplitude points on the leading and trailing edges of the pulse on the assumption that this distance is least effected by variations in amplitude or rise time. This technique is not wholly satisfactory, however, because lower amplitude noise signals are processed with the higher amplitude information signals. Thus many of the pulses whose widths are derived from the half-amplitude points of signals represent noise, not information, and as a result the system is required to perform further processing to separate the information signals from the noise signals. To overcome this shortcoming an offset or threshold voltage is used to raise the width determining level above that of the majority of the noise signals. However, in achieving this the half-amplitude sampling level is no longer at one half the amplitude of the sampled signal. Rather, each signal is measured at points equal to the half-amplitude level plus the threshold voltage. Thus, for example, with a 100 volt information signal and a 1 volt threshold, the pulse width is determined at 51 volts not 50. This is a 1 percent error. But in typical cases where the information signal is 10 volts or 5 volts or even 2 volts the percentage error becomes substantial i.e. 10, 20 and 50 percent, respectively.

SUMMARY OF THE INVENTION

It is therefore an object of this invention to provide an improved pulse width detection circuit for determining the half-amplitude pulse width of a signal with significantly increased accuracy and noise rejection.

It is a further object of this invention to provide an improved pulse width detection circuit for reducing error caused by introduction of a noise rejecting threshold.

The invention results from the realization that threshold error can be substantially reduced by applying the thresholding after, instead of with, the width measurement of the input signal at some predetermined relative amplitude.

The invention features a threshold error compensator circuit which is responsive to an input signal and a pulse derived from the input signal and has a width determined by the width of the input signal at some predetermined relative amplitude. There is a threshold level generator and a comparator, responsive to the threshold level from the threshold level generator and to the input signal to provide a thresholded signal having a pulse width measured at the threshold level. A gate is responsive to the pulse and the thresholded signal to provide an output signal having a pulse width equal to that of the narrower of the pulse and thresholded signal.

DISCLOSURE OF PREFERRED EMBODIMENT

Figure 3:
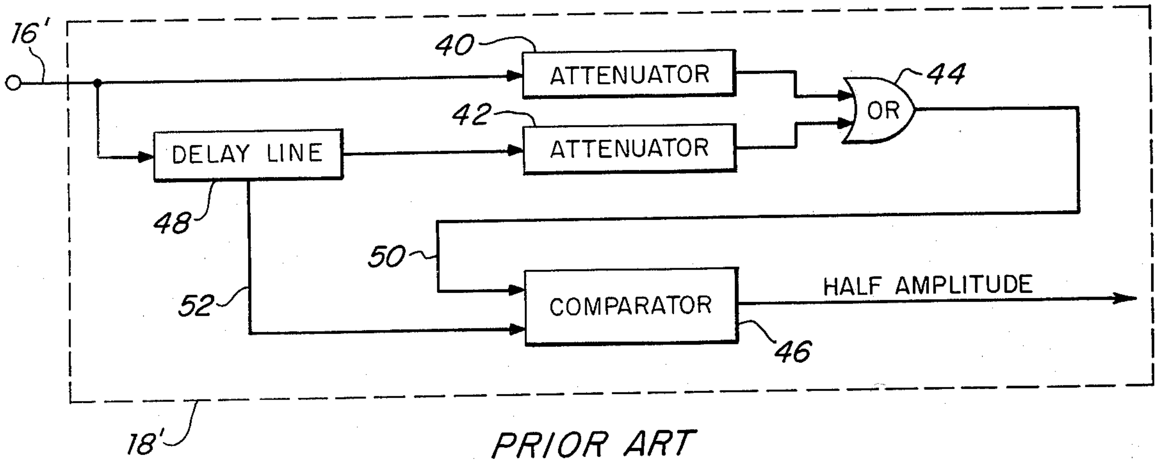
PRIOR ART FIG. 3.
Figure 4:
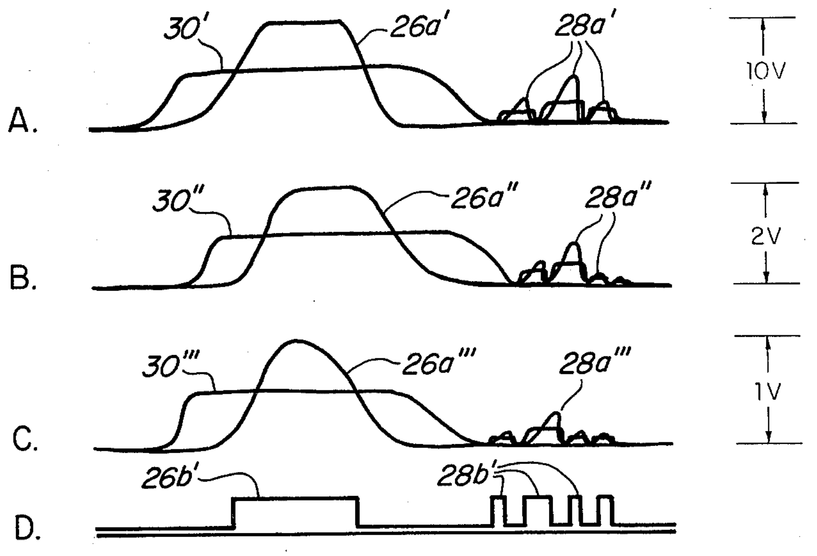
Figure 5:
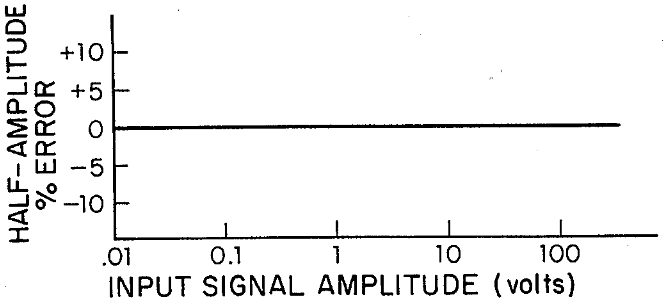
Figure 6:
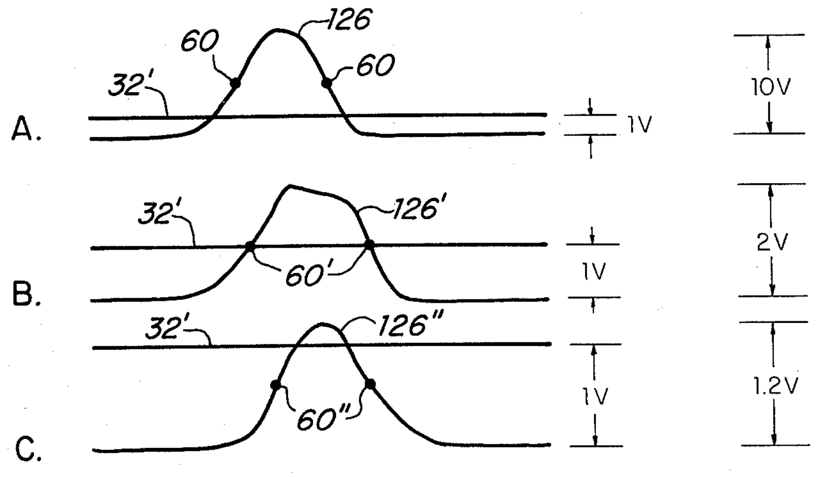
Figure 7:
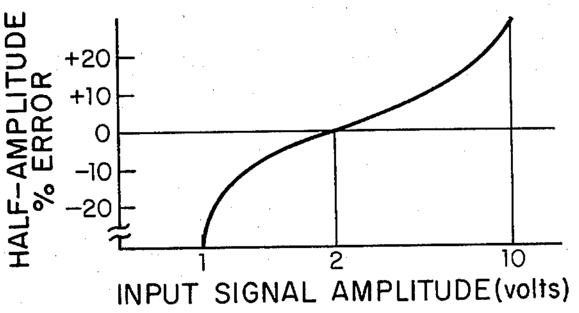
Figure 8:
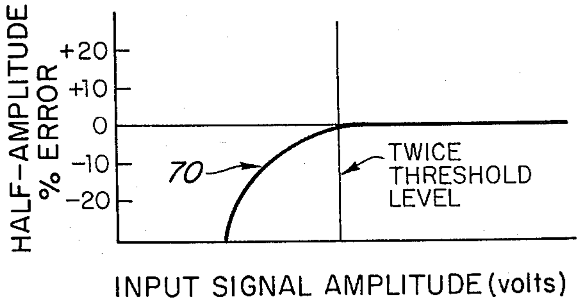

Other objects, features and advantages will occur from the following description of a preferred embodiment and the accompanying drawings, in which:

FIG. 1 is a schematic block diagram of a threshold error compensator circuit according to this invention;

FIGS. 2A–D are timing diagrams showing the relationship of various signals that occur in the circuit of FIG. 1;

FIG. 3 is a more detailed schematic diagram of a prior art pulse width detector which may be used in the circuit of FIG. 1;

FIGS. 4A–D are timing diagrams showing the relationships of various signals in the circuit of FIG. 3;

FIG. 5 illustrates the error that occurs using the circuit of FIG. 3;

FIGS. 6A–C illustrate the relationship of an input signal and threshold level in a simple threshold comparator;

FIG. 7 illustrates the error occurring in a simple threshold comparator system; and FIG. 8 illustrates the error occurring in the system of the circuit of FIG. 1.

The invention may be accomplished using a comparator which receives the input signal to be processed and a threshold level from a threshold level generator. The comparator then produces at its output a thresholded signal comprised of pulses derived from the portions of the input signal which extend above the threshold level. This thresholded signal is applied to an AND gate in conjunction with a second signal from a pulse width detector circuit. The pulse width detector circuit receives the same input signal as the comparator and measures the width of that signal. In one specific embodiment the pulse width detector essentially determines the width of the pulse at the mid- or half-amplitude point.

Figure 2:
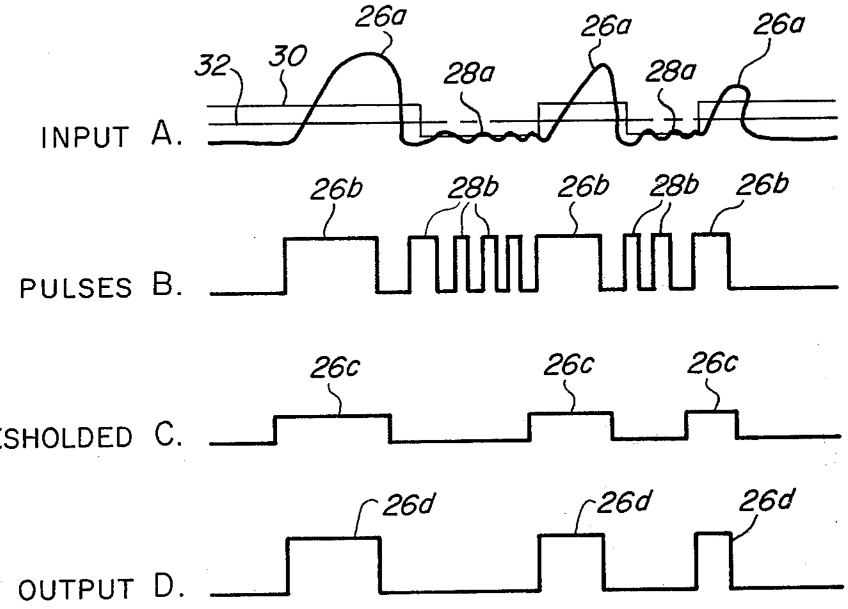

There is shown in FIG. 1 a threshold error compensator circuit 10 including a comparator 12 and threshold generator 14. Comparator 12 is responsive to the threshold level supplied by threshold level generator 14 and to the input signal which appears on line 16. Pulse width detector 18 determines the width of the incoming signal at a predetermined relative amplitude level and produces a pulse of that measured width at its output. That pulse is supplied on line 20 to AND gate 22 whose other input on line 24 is the thresholding signal from comparator 12. A typical input signal, FIG. 2A, may include a number of information portions 26*a* as well as noise portions 28*a*. Pulse width detector 18 operates in a preliminary manner to determine the width of all parts of input signal at some predetermined relative amplitude level 30, FIG. 2A, such as at the half-amplitude point. As a result, counterpart pulses 26*b* and 28*b*, FIG. 2B, are produced for all portions of the input signal. The pulses 26*b* and 28*b*, FIG. 2B, are representative of the type of output provided by the prior art pulse width detector circuits. Because of the presence of both the pulses 26*b* representing information and pulses 28*b* representing noise, subsequent circuitry must be provided in the electronic system to distinguish between the noise and the information in some logical operation.

However, with the threshold error compensator circuit 10, the thresholded signal, FIG. 2C, is provided at the output of comparator 12 whenever any portion of the input signal, FIG. 2A, exceeds threshold level 32. Thus threshold signal, FIG. 2C, includes portions 26*c* corresponding to portions 26*a* and 26*b* but nothing corresponding to pulses 28*b* because the original noise level 28*a* is below the threshold level 32. The pulses, FIG. 2B, and the threshold signal, FIG. 2C, are conjunctively fed to AND gate 22 to provide an output only when it receives both signal 26*b* and signal 26*c* at the same time. The output signal, FIG. 2D, therefore includes portions 26*d* which have a width equal to that of portion 26*b*, FIG. 2B, and less than that of the thresholded signal, FIG. 2C.

Pulse width detector 18, FIG. 1, may be implemented by a prior art pulse width half-amplitude pulse width measuring circuit 18', FIG. 3, which includes two attenuators 40 and 42, comparator 46 and a delay line 48 with a center tap. The input signal is fed directly to attenuator 40 and the input of delay line 48. Attenuator 40 reduces by a factor of two the amplitude of the input signal and supplies it to OR gate 44. The same input signal after being delayed through delay line 48 is fed to attenuator 42 which also reduces it by a factor of two and delivers it to OR gate 44. As a result the output of OR gate 44 corresponds to a half-amplitude, stretched version of the input signal on line 16'. This half-amplitude, stretched signal is fed on line 50 to one input of comparator 46. The other input of comparator 46 is derived from the center tap 52 of delay line 48. Thus the actual input signal is presented on line 52 to comparator 46 simultaneously with a stretched half-amplitude version of itself. The stretched version on line 50 begins before and ends after the actual delayed version of signal 16' which appears on line 52. Comparator 46 produces a half-amplitude pulse width at its output the width being measured by the two crossings, positive going, negative going of the signal on line 52 and the signal on line 50.

This simple, half-amplitude, pulse width detection circuit 18' produces pulses whose widths are the widths of the input signals at the half-amplitude point. However there is not sufficient noise rejection. Thus, for example, in FIG. 4A where the input signal is shown including an information portion 26*a'* and some noise portions 28*a'*; the average amplitude of the information portions is designated as 10 volts. In this case the half-amplitude level 30' will be at 5 volts with respect to portions 26*a'* and at relatively lower levels i.e. 2 to 2½ volts with respect to noise portion 28*a'*. As the amplitude of information portions 26*a''* and 26*a'''*, FIGS. 4B and 4C, shrinks to 2 volts and 1 volt, respectively, the half-amplitude threshold levels 30'' and 30''', respectively, shrink along with it so that the width of information portions 26*a* and noise portions 28*a* are properly determined at the half-amplitude width. As a result, FIG. 4D, the pulses produced represent both the information pulses 26*a'* and the noise pulses 28*b'*. However, since the width of all portions, whether they be information or noise portions, is properly determined at the half-amplitude points on the signals, the error all the way from high signal voltages in a range of 100 volts down to signal voltages in the range of 0.01 volt is zero as shown in FIG. 5.

In comparison, when a simple threshold comparator is used with a one volt threshold level, for example, the half-amplitude pulse width would only be determined accurately when the threshold level is equal to one half of the amplitude of the signal. Thus, in FIG. 6A where the information portion 126 has an amplitude of 10 volts, its half-amplitude points 60 are at 5 volts, 4 volts above the threshold level 32' which is at 1 volt, and so the accuracy is poor and the error is great. In FIG. 6B where the amplitude of the information portion 126' is 2 volts and the threshold level 32' is still at 1 volt, the threshold level 32' coincides directly with the half-amplitude point 60' and 100 percent accuracy results. However, when the information signal 126'', FIG. 6C, is only slightly greater e.g. 1.2 volts than the threshold level 32' which is at one volt, the difference between that level and the mid-amplitude point 60'' is substantial so that the accuracy is poor and the error is great.

In FIG. 7 there is shown the representation of the half-amplitude percent error which occurs in a simple threshold comparator as explained with reference to FIGS. 6A–C. In FIG. 7 it can be seen that such a simple threshold comparator circuit is accurate only when the input signal amplitude is twice the value i.e. 2 volts, of the threshold level, i.e. 1 volt. When the input signal is less or more than that value the accuracy suffers.

The instant threshold error compensator 10, FIG. 1, combines the characteristics of both a simple threshold comparator and a simple half-amplitude or relative width measuring circuit to provide an error characteristic 70, FIG. 8, which has zero percent error from the high amplitudes all the way down to twice the threshold level and only becomes slightly inaccurate below that level.

Other embodiments will occur to those skilled in the art and are within the following claims:

What is claimed is:

1. An improved pulse width measuring system comprising:

a pulse width measuring circuit, responsive to an input signal, for determining the width of an input signal pulse at a predetermined relative amplitude level and providing a pulse width signal representative thereof;

a noise rejecting threshold circuit for generating a threshold level exceeding an expected noise level in said input signal;

a comparator circuit, responsive to said threshold level and said input signal, for providing thresholded signal pulses in response to the input signal amplitude exceeding said threshold level and rejecting lower amplitude input signal portions as noise; and a gating circuit, responsive to said pulse width measuring circuit and said comparator circuit, for passing only said pulse width signals occurring concurrently with said threshold signal pulses and rejecting other pulse width signals as noise.

2. An improved pulse width measuring system comprising:

a half-amplitude width measuring circuit, responsive to an input signal, for determining the width of an input signal pulse at half amplitude level and providing a pulse width signal representative thereof;

a noise rejecting threshold circuit for generating a threshold level exceeding an expected noise level in said input signal;

a comparator circuit, responsive to said threshold level and said input signal, for providing thresholded signal pulses in response to the input signal amplitude exceeding said threshold level and rejecting lower amplitude input signal portions as noise; and a gating circuit, responsive to said half-amplitude pulse width measuring circuit and said comparator circuit, for passing only said pulse width signals occurring concurrently with said threshold signal pulses and rejecting other pulse width signals as noise.

* * * * *